US012073834B2

(12) United States Patent
Ramic et al.

(10) Patent No.: US 12,073,834 B2
(45) Date of Patent: Aug. 27, 2024

(54) MULTIPLE DIGITAL ASSISTANT COORDINATION IN VEHICULAR ENVIRONMENTS

(71) Applicant: GOOGLE LLC, Mountain View, CA (US)

(72) Inventors: Haris Ramic, San Francisco, CA (US); Vikram Aggarwal, Palo Alto, CA (US); Moises Morgenstern Gali, San Francisco, CA (US); Brandon Stuut, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/125,583

(22) Filed: Mar. 23, 2023

(65) Prior Publication Data

US 2023/0230591 A1    Jul. 20, 2023

Related U.S. Application Data

(63) Continuation of application No. 17/861,615, filed on Jul. 11, 2022, now Pat. No. 11,646,029, which is a
(Continued)

(51) Int. Cl.
*G10L 15/22* (2006.01)
*G06F 9/445* (2018.01)
(Continued)

(52) U.S. Cl.
CPC .......... *G10L 15/22* (2013.01); *G06F 9/44505* (2013.01); *G06F 9/44536* (2013.01);
(Continued)

(58) Field of Classification Search
USPC .................................... 704/257, 255, 1–504
See application file for complete search history.

(56) References Cited

U.S. PATENT DOCUMENTS 6,141,759 A     10/2000  Braddy
7,620,549 B2 *  11/2009  Di Cristo .............. G06F 40/232
                                                   704/251
(Continued)

FOREIGN PATENT DOCUMENTS

CN         1627759      6/2005
CN       101467177      6/2009
(Continued)

OTHER PUBLICATIONS

European Patent Office; Intention to Grant issued in Application No. 17787717.2; 54 pages; dated Apr. 14, 2023.
(Continued)

*Primary Examiner* — Marcus T Riley
(74) *Attorney, Agent, or Firm* — Gray Ice Higdon

(57) ABSTRACT

The present disclosure is generally related to a data processing system to selectively invoke applications for execution. A data processing system can receive an input audio signal and can parse the input audio signal to identify a command. The data processing system can identify a first functionality of a first digital assistant application hosted on the data processing system in the vehicle and a second functionality of a second digital assistant application accessible via a client device. The data processing system can determine that one of the first functionality or the second functionality supports the command. The data processing system can select one of the first digital assistant application or the second digital assistant application based on the determination. The data processing system invoke one of the first digital assistant application or the second digital assistant application based on the selection.

16 Claims, 4 Drawing Sheets

Related U.S. Application Data continuation of application No. 16/609,491, filed as application No. PCT/US2017/054846 on Oct. 3, 2017, now Pat. No. 11,410,648.

(51) Int. Cl.

| | | |
|---|---|---|
| *G06F 9/451* | (2018.01) | |
| *G10L 15/08* | (2006.01) | |
| *G10L 15/18* | (2013.01) | |
| *G10L 15/30* | (2013.01) | |

(52) U.S. Cl.
CPC .......... *G06F 9/452* (2018.02); *G10L 15/1822* (2013.01); *G10L 15/30* (2013.01); *G10L 2015/088* (2013.01); *G10L 2015/223* (2013.01)

(56) References Cited

U.S. PATENT DOCUMENTS

| | | | | |
|---|---|---|---|---|
| 7,640,160 | B2* | 12/2009 | Di Cristo | G10L 15/22 704/251 |
| 7,917,367 | B2* | 3/2011 | Di Cristo | G06F 40/30 704/270.1 |
| 7,949,529 | B2* | 5/2011 | Weider | G10L 15/22 715/728 |
| 8,195,468 | B2* | 6/2012 | Weider | G10L 15/1815 704/250 |
| 8,332,224 | B2* | 12/2012 | Di Cristo | G10L 15/22 704/251 |
| 8,447,607 | B2* | 5/2013 | Weider | G10L 21/06 704/250 |
| 8,452,598 | B2 | 5/2013 | Kennewick et al. | |
| 8,620,659 | B2* | 12/2013 | Di Cristo | G10L 15/1815 704/251 |
| 8,849,652 | B2* | 9/2014 | Weider | G10L 21/06 704/270.1 |
| 9,147,296 | B2* | 9/2015 | Ricci | B60R 25/00 |
| 9,147,297 | B2* | 9/2015 | Ricci | B60R 25/01 |
| 9,495,957 | B2* | 11/2016 | Weider | G10L 15/1815 |
| 9,502,025 | B2 | 11/2016 | Kennewick et al. | |
| 9,626,959 | B2* | 4/2017 | Di Cristo | G10L 15/22 |
| 9,626,966 | B2 | 4/2017 | Berndt et al. | |
| 9,740,751 | B1 | 8/2017 | Yeom et al. | |
| 10,051,103 | B1* | 8/2018 | Gordon | G06F 9/451 |
| 10,074,371 | B1* | 9/2018 | Wang | G10L 15/08 |
| 10,178,219 | B1* | 1/2019 | Blanco | G06F 21/6245 |
| 10,297,254 | B2* | 5/2019 | Ni | G10L 15/22 |
| 10,490,190 | B2* | 11/2019 | Ni | G10L 15/1822 |
| 10,580,405 | B1* | 3/2020 | Wang | G10L 15/30 |
| 10,706,842 | B2* | 7/2020 | Hughes | G10L 21/0232 |
| 11,100,931 | B2* | 8/2021 | Nesiba | H04R 29/001 |
| 11,410,648 | B2 | 8/2022 | Ramic et al. | |
| 11,417,324 | B2* | 8/2022 | Hughes | G10L 15/22 |
| 11,568,878 | B2* | 1/2023 | Rikhye | G10L 15/26 |
| 11,646,029 | B2* | 5/2023 | Ramic | G06F 9/44536 704/257 |
| 11,741,958 | B2* | 8/2023 | Nesiba | B60R 16/0373 704/275 |
| 2007/0005368 | A1* | 1/2007 | Chutorash | G10L 15/30 704/275 |
| 2007/0033005 | A1 | 2/2007 | Di Cristo et al. | |
| 2007/0038436 | A1 | 2/2007 | Cristo et al. | |
| 2007/0050191 | A1* | 3/2007 | Weider | G06F 16/951 704/E15.04 |
| 2009/0150156 | A1 | 6/2009 | Kennewick et al. | |
| 2011/0112921 | A1 | 5/2011 | Kennewick et al. | |
| 2012/0109753 | A1 | 5/2012 | Kennewick et al. | |
| 2013/0157647 | A1* | 6/2013 | Kolodziej | B60K 35/00 455/419 |
| 2014/0137090 | A1 | 5/2014 | Whitcomb et al. | |
| 2014/0309790 | A1* | 10/2014 | Ricci | G06F 16/24575 700/276 |
| 2014/0309869 | A1* | 10/2014 | Ricci | G08G 1/096775 701/36 |
| 2014/0309892 | A1* | 10/2014 | Ricci | B60W 50/10 701/49 |
| 2014/0309893 | A1* | 10/2014 | Ricci | G06F 3/0481 701/1 |
| 2014/0324275 | A1* | 10/2014 | Stanek | G07C 5/008 701/31.4 |
| 2015/0170653 | A1 | 6/2015 | Berndt et al. | |
| 2016/0042748 | A1 | 2/2016 | Jain et al. | |
| 2016/0244011 | A1* | 8/2016 | Ricci | G06F 3/0673 |
| 2016/0318468 | A1* | 11/2016 | Ricci | H04W 4/40 |
| 2016/0360382 | A1* | 12/2016 | Gross | H04W 4/50 |
| 2017/0351532 | A1 | 12/2017 | Li et al. | |
| 2018/0096681 | A1* | 4/2018 | Ni | G10L 15/063 |
| 2018/0253148 | A1* | 9/2018 | Santamaria | G06F 9/451 |
| 2018/0357073 | A1* | 12/2018 | Johnson | H04M 1/72403 |
| 2019/0096406 | A1* | 3/2019 | Ni | G10L 15/1822 |
| 2019/0361694 | A1* | 11/2019 | Gordon | G06F 9/452 |
| 2020/0004791 | A1* | 1/2020 | Ricci | G01C 21/3697 |
| 2020/0066263 | A1* | 2/2020 | Hughes | G10L 21/0232 |
| 2020/0184962 | A1* | 6/2020 | Chen | G10L 15/08 |
| 2020/0202853 | A1 | 6/2020 | Ramic et al. | |
| 2020/0294496 | A1* | 9/2020 | Hughes | G10L 15/02 |
| 2021/0056964 | A1* | 2/2021 | Nesiba | H04S 7/30 |
| 2021/0375287 | A1* | 12/2021 | Nesiba | G06F 3/165 |
| 2022/0335953 | A1* | 10/2022 | Rikhye | G10L 15/22 |
| 2022/0343912 | A1* | 10/2022 | Ramic | G06F 9/44505 |
| 2022/0383872 | A1* | 12/2022 | Li | G06F 40/205 |
| 2022/0392441 | A1* | 12/2022 | Hughes | G10L 15/08 |
| 2023/0169984 | A1* | 6/2023 | Rikhye | G10L 17/24 704/235 |
| 2023/0230591 | A1* | 7/2023 | Ramic | G06F 3/167 704/257 |

FOREIGN PATENT DOCUMENTS

| | | | | |
|---|---|---|---|---|
| CN | 103282957 | | 9/2013 | |
| CN | 103975359 | | 8/2014 | |
| CN | 105282139 | | 1/2016 | |
| CN | 105284136 | | 1/2016 | |
| CN | 105320429 | | 2/2016 | |
| CN | 106796517 | | 5/2017 | |
| CN | 107004094 | | 8/2017 | |
| CN | 107004410 | | 8/2017 | |
| CN | 107112015 | | 8/2017 | |
| CN | 107210033 | | 9/2017 | |
| CN | 116806355 A | * | 9/2023 | ............ G06F 21/32 |
| JP | 2017535823 A | * | 11/2017 | |

OTHER PUBLICATIONS

China National Intellectual Property Administration; Notice of Allowance issued in Application No. 201780091999.7; 5 pages; dated Apr. 15, 2023.
China National Intellectual Property Administration; First Office Action issued in Application No. 201780091999.7; 37 pages; dated Nov. 2, 2022.
Appdevdaily; App development overview of smart car applications; https://blog.csdn.net/appdevdaily/article/details/44155055; 4 pages; dated Mar. 19, 2015.
Liu, Qi; Research on Application of Interconnection between In-Vehicle Mobile Phone APP and Vehicle Control System; Public Communication of Science & Technology; 3 pages; dated Sep. 8, 2018.
European Patent Office; Communication pursuant to Article 94(3) issued in Application No. 17787717.2, 5 pages, dated Aug. 16, 2022.
European Patent Office; Communication pursuant to Article 94(3) EPC issued in Application No. 17787717.2; 9 pages; dated Nov. 23, 2021.
Intellectual Property India; Examination Report issued in Application No. 201927050875; 7 pages; dated May 13, 2021.
European Patent Office; Written Opinion of the International Preliminary Examining Authority of Ser No. PCT/US2017/054846; 9 pages; dated Sep. 11, 2019.
European Patent Office; International Search Report and Written Opinion of Ser No. PCT/US2017/054846; 13 pages; dated Apr. 24, 2018.

(56) References Cited

OTHER PUBLICATIONS

European Patent Office; Extended European Search Report issued for Application No. 23192799.7, 14 pages, dated Dec. 6, 2023.
Lind R. et al.; The Network Vehicle—A Glimpse into the Future of Mobile Multi-Media; IEEE Aerospace and Electronic Systems Magazine; vol. 14, No. 9; 6 pages; dated Sep. 1999.
European Patent Office; Communication pursuant to Article 94(3) EPC issued in Application No. 23192799.7; 4 pages; dated Jun. 14, 2024.

* cited by examiner

MULTIPLE DIGITAL ASSISTANT COORDINATION IN VEHICULAR ENVIRONMENTS

BACKGROUND

Excessive network transmissions, packet-based or otherwise, of network traffic data between computing devices can prevent a computing device from properly processing the network traffic data, completing an operation related to the network traffic data, or responding timely to the network traffic data. The excessive network transmissions of network traffic data can also complicate data routing or degrade the quality of the response when the responding computing device is at or above its processing capacity, which may result in inefficient bandwidth utilization. A portion of the excessive network transmissions can include transmissions for requests that are not valid requests.

SUMMARY

According to an aspect of the disclosure, a system to selectively invoke applications for execution can include a data processing system of a vehicle. A natural language processor component executed by the data processing system can receive, via an interface, an input audio signal. The natural language processor component can parse the input audio signal to identify a request and a command corresponding to the request. A configuration tracker executed by the data processing system can identify a first functionality of a first digital assistant application hosted on the data processing system in the vehicle and a second functionality of a second digital assistant application accessible via a client device communicatively coupled to the data processing system. An application selector executed by the data processing system can determine that one of the first functionality or the second functionality supports the command corresponding to the request. The application selector can select one of the first digital assistant application hosted on the data processing system or the second digital assistant application accessible via the client device based on the determination that one of the first functionality or the second functionality supports the command. The application selector can invoke one of the first digital assistant application or the second digital assistant application, selected based on the determination that one of the first functionality or the second functionality supports the command.

According to an aspect of the disclosure, a method to validate vehicular functions can include a natural language processor component executed by a data processing system of a vehicle receiving, via an interface, an input audio signal. The method can include the natural language processor component parsing the input audio signal to identify a request and a command corresponding to the request. The method can include a configuration tracker executed by the data processing system identifying a first functionality of a first digital assistant application hosted on the data processing system in the vehicle and a second functionality of a second digital assistant application accessible via a client device communicatively coupled to the data processing system. The method can include an application selector executed by the data processing system, determining that one of the first functionality or the second functionality supports the command corresponding to the request. The method can include the application selector selecting one of the first digital assistant application hosted on the data processing system or the second digital assistant application accessible via the client device based on the determination that one of the first functionality or the second functionality supports the command. The method can include the application selector invoking one of the first digital assistant application or the second digital assistant application, selected based on the determination that one of the first functionality or the second functionality supports the command.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
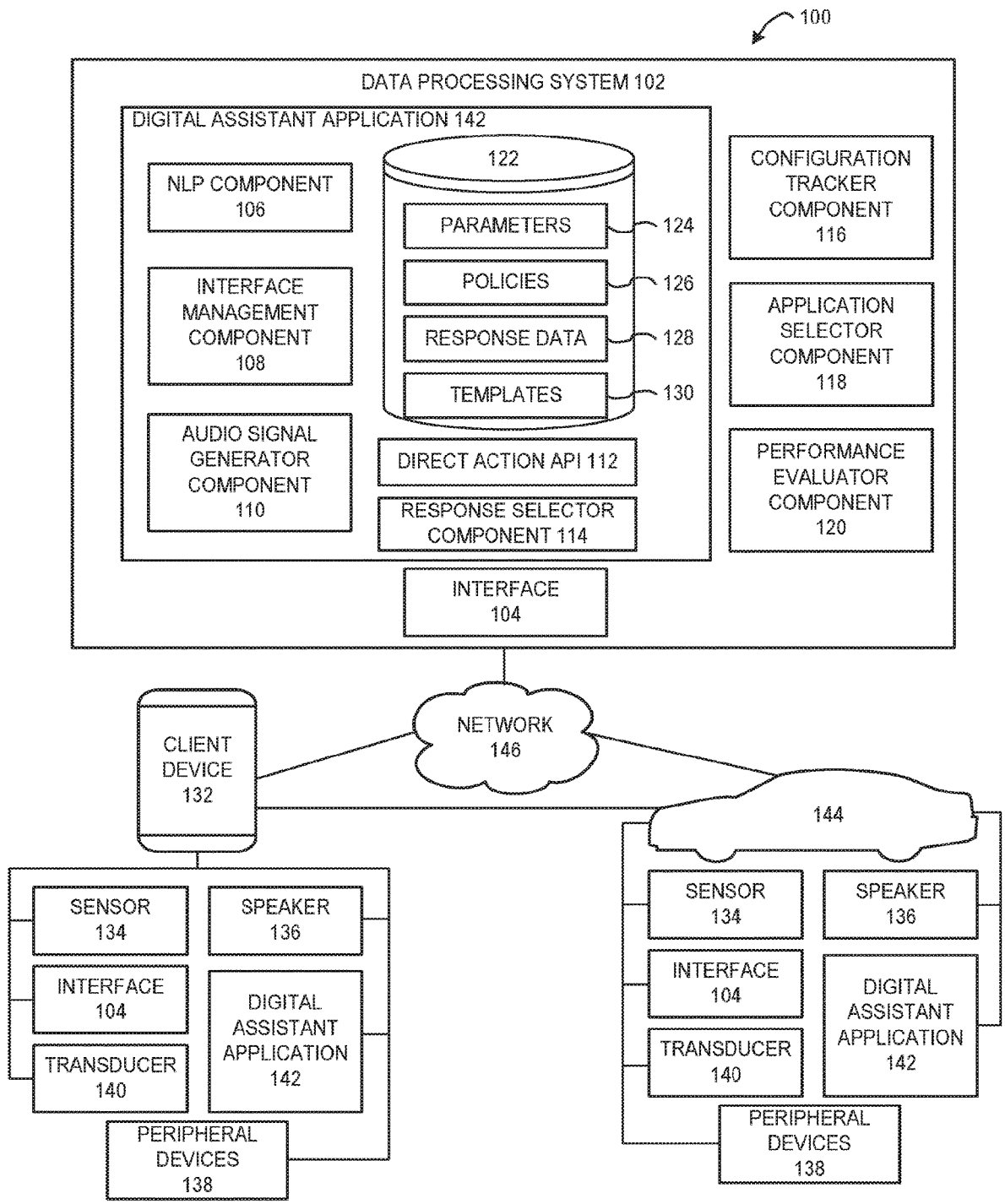
FIG. 1 illustrates an example system to selectively invoke applications for execution.

Following below are more detailed descriptions of various concepts related to, and implementations of, methods, apparatuses, and systems to selectively invoke applications for execution in vehicular environments. The vehicular environment can include the vehicle and its surroundings, including a radius around the vehicle (e.g. 100 feet) as well as devices that are connected to the vehicle via wired or wireless electronic communication systems. The various concepts introduced above and discussed in greater detail below may be implemented in any of numerous ways.

The present disclosure is generally directed to a data processing system to selectively invoke applications for execution in vehicular environments. The systems and methods described herein can include a data processing system in a vehicle that can receive an audio input query, which can also be referred to herein as an audio input signal. From the audio input query, the data processing system can identify a request. The request can correspond to a command to perform one of various functions, such as a vehicular function (e.g., to open a window or to activate a windshield wiper) or a non-vehicular function (e.g., to make a phone call or to access a calendar). Digital assistant applications can carry, obtain, respond to, or process the command extracted from the audio input query. The digital assistant application can be a program or script executed on the data processing system, the vehicle, and the client device (e.g., a smartphone, tablet, laptop, desktop, etc.) interfacing with the data processing system via the cloud. The digital assistant application can receive audio input queries, process the requests associated with such queries using natural language processing algorithms, and then present an audio response in a conversational manner.

There can be multiple digital assistant applications available in the vehicular environment, each with various functionalities to carry out the requested command. Certain commands may be performed by a primary digital assistant application hosted on the data processing system in the vehicle, while other commands can be performed by a secondary digital assistant application accessible via a client device (e.g., smartphone or tablet). The client device and the data processing system can have established a communication link with each other. Even with commands that may be carried out either on the data processing system or through the client device, some commands can be executed faster or more efficiently at one digital assistant application versus the other digital assistant application because such commands may be performed via network access. With vehicular environments, however, there may be limited connectivity to the network. The data processing system on the vehicle itself may not be connected to the network. In addition, the client device may move in and out of range of wireless networks. As such, the functionalities of either the primary or secondary digital assistant application may vary.

To carry out the identified command, the data processing system can identify functionalities of the primary digital assistant application hosted in the vehicle and functionalities of the secondary digital assistant application accessible via the client device. With the functionalities of both applications identified, the data processing system can determine which digital assistant application supports the command as requested in the audio input query. Based on the determination, the data processing system can select which of the primary or secondary digital assistant application to use in carrying out the requested command. Once selected, the data processing system can invoke the corresponding digital assistant application. When the primary digital assistant application is selected, the data processing system can execute the requested command via the primary digital assistant application. Conversely, when the secondary digital assistant application is selected, the data processing system can send a command to the client device via the communication link to carry out the requested command using the secondary digital assistant application.

The present solution can improve efficiency and effectiveness of auditory data packet processing by selecting the appropriate digital assistant application to perform the command of the request contained in the auditory data packet. As the functionalities may vary across the multiple digital assistant applications, the present solution also can reduce network bandwidth and computing resource consumption by selecting the digital assistant application that can perform the command more efficiently than the other applications. From a human-computer interaction (HCI) perspective, the seamless transition in selectively invoking one of multiple digital assistant applications may improve the utility of all the digital assistant applications available in the vehicular environment.

FIG. 1 illustrates an example system 100 to selectively invoke applications for execution in vehicular environments. The system 100 can include at least one data processing system 102, one or more client devices 132, and one or more vehicles 144. The one or more client devices 132 can be communicatively coupled to the one or more vehicles 144, and vice-versa. The at least one data processing system 102, one or more client devices 132, and one or more vehicles 144 can be communicatively coupled to one another via the network 146.

The data processing system 102 can include an interface 104. The data processing system 102 can include a natural language processor (NLP) component 106 to parse audio-based inputs. The data processing system 102 can include an interface management component 108 to detect and manage the interfaces of other devices in the system 100. The data processing system 102 can include an audio signal generator component 110 to generate audio-based signals. The data processing system 102 can include a direct action application programming interface (API) 112. The data processing system 102 can include a response selector component 114 to select responses to audio-based input signals. The NLP component 106, the interface management component 108, the audio signal generator component 110, the data repository 122, the direct action API 112, and the response selector component 114 may be part of a digital assistant application 142. The data processing system 102 can include a data repository 122. The data repository 122 can store parameters 124, policies 126, response data 128, and templates 130. The data processing system 102 can also include a configuration tracker component 116, an application selector component 118, and a performance evaluator component 120, among others.

The functionalities of the data processing system 102, such as the digital assistant application 142, can be included or otherwise be accessible from the one or more client devices 132 and the one or more vehicles 144. The functionalities of the data processing system 102 may correspond to the functionalities or interface with the digital assistant application 142 executing on the client devices 132 or the vehicles 144. The client devices 132 can each include and execute a separate instance of the one or more components of the digital assistant application 142. The client devices 132 can otherwise have access to the functionalities of the components of the digital assistant application 142 on a remote data processing system 102 via the network 146. For example, the client device 132 can include the functionalities of the NLP component 106 and access the remainder of the components of the digital assistant application 142 via the network 146 to the data processing system 102. The vehicle 144 can include and execute a separate instance of the components of the data processing system 102, such as the digital assistant application 142, the configuration tracker component 116, the application selector component 118, and the performance evaluator component 120. For example, the digital assistant application 142 may be pre-installed on a head unit of a vehicle 144. The digital assistant applications 142 accessible or executing on the client devices 132 and the vehicles 144 may each have different functionalities.

The client devices 132 and the vehicles 144 can each include at least one logic device such as a computing device having a processor to communicate with each other with the data processing system 102 via the network 146. The client devices 132 and the vehicles 144 can include an instance of any of the components described in relation to the data processing system 102. The client devices 132 and the vehicles 144 can include an instance of the digital assistant application 142. The client devices 132 can include a desktop computer, laptop, tablet computer, personal digital assistant, smartphone, mobile device, portable computer, thin client computer, virtual server, speaker-based digital assistant, or other computing device. The vehicle 144 can be a car, truck, motorcycle, airplane, blimp, boat, submarine, or other transportation device. The vehicle 144 can include one or more processors that can execute an instance of the digital assistant application 142 or any component thereof. The processors can be a component of the head unit disposed in the vehicle 144, such as a head unit in an automobile.

The components of the system 100 can communicate over a network 146. In some implementations, one or more of the client devices 132 can be located within an instance of the vehicle 144. For example, the client devices 132 can be the mobile phone of a driver driving the vehicle 144. In some implementations, one or more of the client devices 132 can be remote to the vehicles 144. For example, after the driver parks and exits the vehicle 144 for work, the driver's mobile phone may be remote to the vehicle 144.

The network 146 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, an NFC (Near-Field Communication) network, a local area network (LAN), a wireless network or a wireline network, and combinations thereof. The network 146 can include a wireless link, such as an infrared channel or satellite band. The topology of the network 146 may include a bus, star, or ring network topology. The network 146 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The network 146 can include a short-range communication link (e.g., ranging up to 30 meters) established between the client devices 132 and the vehicles 144, using Bluetooth, Bluetooth Low Energy, Dedicated Short-Range Communications (DSRC), or Near-Field Communications (NFC) protocols. Using such protocols, the data processing system 102 can establish a communication link with one or more client devices 132 via the interface 104. The data processing system 102 can establish a communication link with one or more vehicles 144 via the interface 104. The short-range communication link may be established between the client devices 132 and the vehicles 144 via pairing protocol.

The client devices 132 can include sensors 134, speakers 136, peripheral devices 138, interfaces 104, and transducers 140. The client devices 132 can execute an instance of the digital assistant application 142. The vehicles 144 can include sensors 134, speakers 136, peripheral devices 138, interfaces 104, and transducers 140. The vehicles 144 can execute an instance of the NLP component 106. The peripheral devices 138 for the client device 132 can include user input/output devices, such as a keyboard, a monitor, and headphones, among others. The peripheral devices 138 for the vehicle 144 can include any other devices, such as a garage door opener, a window opener, a passenger door opener, a trunk opener, a multimedia device player, and a temperature control, among others.

The client devices 132 and the vehicle 144 can include at least one sensor 134, at least one transducer 140, at least one audio driver, and at least one speaker 136. The sensor 134 can include a microphone or audio input sensor. The sensor 134 can also include at least one of a GPS sensor, proximity sensor, ambient light sensor, temperature sensor, motion sensor, accelerometer, or gyroscope. The sensor can include an occupancy or weight sensor. The transducer 140 can convert the audio input into an electronic signal. The audio driver can include a script or program executed by one or more processors of the client devices 132 or the vehicle 144 to control the speaker 136. The speaker 136 can render audio signals by converting electrical signals into audible waves.

The client devices 132 and the vehicle 144 can be associated with an end user that enters voice queries as input audio signals into the client devices 132 or the vehicle 144 (via the sensor 134) and receives audio output in the form of a computer generated voice that can be provided from the data processing system 102. In response to the input audio signals, the client devices 132 and the vehicle 144 can also receive action data structures to perform predetermined functions or actions. The interface 104 can receive or provide data messages to the direct action API 112 of the data processing system 102 and enable communication between the components of the system 100. The client devices 132 and the vehicle 144 can also include a user interface that enables a user to interact with the components of the system 100.

The data processing system 102 can include at least one server having at least one processor. For example, the data processing system 102 can include a plurality of servers located in at least one data center or server farm. The data processing system 102 can determine from an audio input signal a request and a trigger keyword associated with the request. Based on the request and trigger keyword, the data processing system 102 can generate or select response data. The response data can be audio-based or text-based. For example, the response data can include one or more audio files that, when rendered, provide an audio output or acoustic wave. The data within the response data can also be referred to as content items. The response data can include other content (e.g., text, video, or image content) in addition to audio content.

The data processing system 102 can include multiple, logically grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 can include servers in a data center that are stored in one or more high-density rack systems, along with associated storage systems, located for example in an enterprise data center. In this way, the data processing system 102 with consolidated servers can improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage. Each of the components of the data processing system 102 can include at least one processing unit, server, virtual server, circuit, engine, agent, appliance, or other logic device such as programmable logic arrays configured to communicate with the data repository 122 and with other computing devices.

The data processing system 102 can include the data repository 122. The data repository 122 can include one or more local or distributed databases and can include a database management system. The data repository 122 can include computer data storage or memory and can store one or more parameters 124, one or more policies 126, response data 128, and templates 130, among other data. The parameters 124, policies 126, and templates 130 can include information such as rules about a voice based session between the client devices 132, the data processing system 102, and the vehicle 144. The parameters 124, policies 126, and templates 130 can also include information for another digital assistant application 142 received via the interface 104 from another source (e.g., the data processing system 102, the client devices 132, and the vehicles 144). For example, the parameters 124, policies 126, and templates 130 stored in the data repository 122 of a digital assistant application 142 hosted on a vehicle 144 can include the parameters 124, policies 126, and templates 130 from the data repository 122 of a digital assistant application 142 accessible via the client device 132, and vice-versa. In this manner, the parameters 124, policies 126, and templates 130 of different digital assistant applications 142 may be shared and used by one another. The response data 128 can include content items for audio output or associated metadata, as well as input audio messages that can be part of one or more communication sessions with the client devices 132.

An application, script, program, or other components that are associated with the data processing system 102 can be installed at the client devices 132 or the vehicle 144. The application can enable the client devices 132 or vehicle 144 to communicate input audio signals (and other data) to the interface 104 of the data processing system 102. The application can enable the client devices 132 and the vehicle 144 to drive components of the client devices 132 and the vehicle 144 to render the output audio signals.

The NLP component 106 can receive input audio signals. The data processing system 102 can receive the input audio signal from the client devices 132 or the vehicle 144 (e.g., via the transducers 140) included in a data packet. A first device can execute the NLP component 106, and the NLP component 106 can receive the input audio signal from a second device. For example, a client device 132 can receive the input audio signal from and the data processing system 102 can execute the NLP component 106.

The NLP component 106 can convert input audio signals into recognized text by comparing the input audio signal against a stored, representative set of audio waveforms and choosing the closest matches. The representative waveforms can be generated across a large set of input audio signals. Once the input audio signal is converted into recognized text, the NLP component 106 can match the text to words that are associated, for example, via a learning phase, with actions or output audio signals.

From the input audio signal, the NLP component 106 can identify at least one request or at least one command corresponding to the request. The request can indicate intent or subject matter of the input audio signal. The command can indicate a type of action likely to be taken. For example, the NLP component 106 can parse the input audio signal to identify at least one request to open the vehicle's windows or skip to a next audio file in a music playlist. The command can include at least one word, phrase, root or partial word, or derivative indicating an action to be taken. The request can also include a trigger keyword. The trigger keyword may be associated with a particular digital assistant application accessible via the client device 132 or running on the vehicle 144. For example, the trigger keywords "go" may be associated with the digital assistant application accessible via the client device 132, and "ok" may be associated with the digital assistant application running on the vehicle 144. Which digital assistant application is selected to execute the indicated command is detailed herein.

The NLP component 106 can also determine whether the at least one command corresponding to the request of the input audio signal relates to a vehicle functionality of the vehicle 144 or to a non-vehicle functionality of the client device 132. Upon extraction of the intent, subject matter, and the command from the input audio signal, the NLP component 106 can compare the word, phrases, root or partial words, or derivatives to a semantic knowledge graph. The semantic knowledge graph may specify a set of words, phrases, root or partial words, or derivatives relating to a vehicle functionality and non-vehicle functionality. For example, "windshield" may be marked as related to a vehicle functionality and "phonebook" may be marked as related to a non-vehicle functionality. The semantic knowledge graph may also specify a relationship between each word, phrase, root or partial word, or derivative. The semantic knowledge graph may be maintained at the data repository 122. Based on the comparison with the semantic knowledge graph, the NLP component 106 can determine whether the word, phrase, root or partial word, or derivative of the command relates to a vehicle functionality or a non-vehicle functionality.

The response selector component 114 can obtain information from the data repository 122 where it can be stored as part of the response data 128. The response selector component 114 can query the data repository 122 to select or otherwise identify response phrases or content items, e.g., from the response data 128.

The audio signal generator component 110 can generate or otherwise obtain an output signal that includes the content item. The data processing system 102 can execute the audio signal generator component 110 to generate or create an output signal corresponding to the content item or request. For example, once a request is fulfilled, the audio signal generator component 110 can generate an audio output signal that includes the phrase "The action was completed."

The interface 104 can be a data interface or a network interface that enables the components of the system 100 to communicate with one another. The interface 104 of the data processing system 102 can provide or transmit one or more data packets that include the action data structure, audio signals, or other data via the network 146 to the client devices 132 or vehicle 144. For example, the data processing system 102 can provide the output signal from the data repository 122 or from the audio signal generator component 110 to the client devices 132. The data processing system 102 can also instruct, via data packet transmissions, the client devices 132 or the vehicle 144 to perform the functions indicated in the action data structure. The output signal can be obtained, generated, transformed to, or transmitted as one or more data packets (or other communications protocol) from the data processing system 102 (or other computing device) to the client devices 132 or the vehicle 144.

The direct action API 112 of the data processing system 102 can generate, based on, for example, the request, action data structures. The action data structure can include data or instructions for the execution of a specified action to satisfy the request. In some implementations, the action data structure can be a JSON formatted data structure or an XML formatted data structure. The direct action API 112 may be prevented from carrying out the action specified in the request until invocation by the application selector component 118. The details of the functionalities of the application selector component 118 in relation to the direct action API 112 are explained below.

Depending on the action specified in the request, the direct action API 112 can execute code or a dialog script that identifies the parameters required to fulfill the request. The action data structures can be generated responsive to the request. The action data structure can be included in messages that are transmitted to or received by the client devices 132 or the vehicle 144. Based on the request parsed by the NLP component 106, the direct action API 112 can determine to which of the client devices 132 or the vehicles 144 the message should be sent for processing. Whether the client device 132 or the vehicle 144 is selected to process the message is detailed below with respect to the application selector component 118. The direct action API 112 can package the request into an action data structure for transmission to the vehicle 144. The direct action API 112 can access a vehicle ID from the response data 128 to determine which vehicle is associated with the user that generated the request. Once received, the vehicle 144 can process the action data structure and can perform the indicated action. The direct action API 112 can also package the request into an action data structure for execution by the client device 132. Once received, the client device 132 can process the action data structure using the digital assistant application 142 or one or more applications running on the client device 132.

The action data structure can include information for completing the request. For example, the action data structure can be an XML or JSON formatted data structure that includes attributes used in completing or otherwise fulfilling the request. The attributes can include a location of the vehicle 144, a location of the client devices 132, an authorization level of a user associated with a client devices 132, a vehicle identifier, an interface identifier, a vehicular state, or a request state. In some implementations, the request state includes one or more attributes that should be satisfied before the action is fulfilled. For example, with the request "Ok, change the song," the request state may have the attribute {requestor[authorized, passenger]}, indicating that the request should be an explicitly authorized user or a passenger in the vehicle.

The direct action API 112 can retrieve a template 126 from the repository 122 to determine which fields or attributes to include in the action data structure. The direct action API 112 can determine necessary parameters and can package the information into an action data structure. The direct action API 112 can retrieve content from the repository 122 to obtain information for the attributes of the data structure.

The direct action API 112 can populate the fields with data from the input audio signal. The direct action API 112 can also populate the fields with data from the client devices 132 or the vehicle 144, or from another source. The direct action API 112 can prompt a user for additional information when populating the fields. The templates 130 can be standardized for different types of actions, such as playing media files through the vehicle's head unit, responding to messages, and performing functions within the vehicle 144. The action data structure can initially be generated by a direct action API 112 executed by a remote data processing system 102. The remote data processing system 102 can transmit the action data structure to the data processing system 102 of the vehicle 144, which can add fields and attributes to the action data structure.

The direct action API 112 can obtain response data 128 (or parameters 124 or policies 126) from the data repository 122, as well as data received with end user consent from the client devices 132 to determine location, time, user accounts, and logistical or other information in order to reserve a car from the car share service. The response data 128 (or parameters 124 or policies 126) can be included in the action data structure. When the content included in the action data structure includes end user data that is used for authentication, the data can be passed through a hashing function before being stored in the data repository 122.

The data processing system 102 can include, interface, or otherwise communicate with the configuration tracker component 116. The configuration tracker component 116 can be hosted on and executed from the vehicle 144. The configuration tracker component 116 can identify a functionality of each digital assistant application. The configuration tracker component 116 can identify each digital assistant application 142 running on or otherwise accessible via a client device 132. The configuration tracker component 116 can identify each digital assistant application 142 running on the vehicle 144. The client device 132 may be communicatively coupled (e.g., via network 146 or via a short-range communication link) to the data processing system 102 or the vehicle 144. With the communication link established, each digital assistant application 142 accessible from the vehicle 144, such as the digital assistant application 142 running on the vehicle 144 and the digital assistant application 142 accessible via the client device 132, may be prevented from executing the action specified by the command until invoked by the application selector component 118. In addition, the transducer 140 at the client device 132 may also be disabled until the digital assistant application 142 is invoked by the application selector component 118. Details of the functionality of the application selector component 118 are explained below.

The functionalities of the digital assistant application 142 hosted on the vehicle 144 (sometimes referred to as a "primary digital assistant application") may differ from the functionalities of the digital assistant application 142 accessible via the client device 132 (sometimes referred to as a "secondary digital assistant application"). For example, the digital assistant application 142 installed on the vehicle 144 may activate various function on the vehicle 144, such as opening a door, turning on a windshield, or changing temperature controls. On the other hand, the digital assistant application 142 accessible through the client device 132 may carry out other functions, such as making a telephone call or accessing a calendar. For functionalities of the digital assistant application 142 accessible via the client device 132 that do not differ from the functionalities of the digital assistant application 142 hosted on the vehicle 144, one of the digital assistant applications 142 may be able to execute the functionality faster or more efficiently.

The configuration tracker component 116 can identify the functionalities of each digital assistant application 142 accessible via the client device 132. There may be multiple digital assistant applications 142 accessible via multiple client devices 132. The configuration tracker component 116 can identify an application profile of the digital assistant application 142. The application profile may include metadata for the digital assistant application 142 and may indicate a name and a type for the application. The configuration tracker component 116 can identify a version number of the digital assistant application 142. The configuration tracker component 116 can identify a connectivity of the client device 132 to the vehicle 144 or to an external network (e.g., the network 146) for accessing the remote data processing system 102. The configuration tracker component 116 can identify one or more routines or processes (e.g., application programming interface (API) calls) supported or used by the digital assistant application 142. The configuration tracker component 116 can identify one or more peripheral devices 138 interfacing with the client device 132. The one or more peripheral devices 138 may include input/output devices, such as a monitor, keyboard, and card-reader, among others, connected to the client device 132. The configuration tracker component 116 can identify consumption of computing resources at the client device 132 (e.g., CPU time, remaining battery life, or memory use, for example) through which the digital assistant application 142 is accessed.

The configuration tracker component 116 can identify the functionalities of the digital assistant application 142 hosted on the vehicle 144. The configuration tracker component 116 can identify an application profile of the digital assistant application 142. The application profile may include metadata for the digital assistant application 142 and may indicate a name and a type for the application. The configuration tracker component 116 can identify a version number of the digital assistant application 142. The version number of the digital assistant application 142 hosted on the vehicle 144 may differ from the version number of the digital assistant application 142 accessible via the client device 132. The configuration tracker component 116 can identify a connectivity of the vehicle 144 to the client device 132 or to an external network (e.g., the network 146) for accessing the remote data processing system 102. The configuration tracker component 116 can identify one or more routines or processes (e.g., application programming interface (API) calls) supported or used by the digital assistant application 142. The configuration tracker component 116 can identify one or more peripheral devices 138 interfacing with the vehicle 144. The one or more peripheral devices 138 may include various devices in the vehicle 144, such as a temperature control, passenger door opener, trunk opener, garage door opener, a steering wheel, and multimedia device, among others accessible by the digital assistant application 142 running from the vehicle 144. The configuration tracker component 116 can identify consumption of computing resources (e.g., CPU time, remaining battery life, memory use, etc.) at the vehicle 144 hosting the digital assistant application 142.

The data processing system 102 can include, interface, or otherwise communicate with the application selector component 118. The application selector component 118 can be hosted on and executed from the vehicle 144. The application selector component 118 can determine whether the functionality of the digital assistant application 142 accessible via the client device 132 or the functionality of the digital assistant application 142 hosted on the vehicle 144 can support the command corresponding to the request. The application selector component 118 can identify an action specified by the command as processed by the NLP component 106. The application selector component 118 can parse the action data structure generated by the direct action API 112 to identify the specified action.

To determine that the specified action is (or is not) supported by the digital assistant application 142, the application selector component 118 can compare the operational capabilities or functionality of the digital assistant application 142 accessible via the client device 132 to the action specified by the command. The application selector component 118 can also compare the operational capabilities or functionality of the digital assistant application 142 hosted on the vehicle 144. The application selector component 118 can determine that the functionality of the digital assistant application 142 can support the action specified by the command based on combination of factors. The application selector component 118 can determine that the action corresponding to one or more routines or processes of the digital assistant application 142 corresponding to the action specified by the command. Responsive to the determination, the application selector component 118 can determine that the functionality of the digital assistant application 142 supports the action. The application selector component 118 can determine that the action specified by the command is performed via an external network. Responsive to the determination, the application selector component 118 can determine that the functionality of the digital assistant application 142 supports the action when there is access to the external network (e.g., network 146). The application selector component 118 can determine the action specified by the command is performed via a particular peripheral device 138. Responsive to the determination, the application selector component 118 can identify whether the particular peripheral device 138 is interfacing with the client device 132, and the particular peripheral devices 138 is interfacing with the vehicle 144. The application selector component 118 can determine the action specified by the command is performed by a particular type of application (e.g., the digital assistant application 142 at the vehicle 144 or the digital assistant application 142 on the client device 132). Responsive to the determination, the application selector component 118 can determine whether the application profile of the digital assistant application 142 is a type of application that can carry out the specification action.

Based on the determination of the functionality of the respective digital applications 142, the application selector component 118 can select one of the digital assistant application 142 accessible via the client device 132 or the functionality of the digital assistant application 142 hosted on the vehicle 144. For example, the application selector component 118 can set the digital assistant application 142 hosted together on the vehicle 144 as the default digital assistant application and set the digital assistant application 142 accessible via the client device 132 as the secondary digital assistant application. In the absence of the secondary digital assistant application, the application selector component 118 can select the primary digital assistant application to carry out the command. The application selector component 118 can determine the functionality of the digital assistant application 142 accessible via the client device 132 can support the action specified by the command. Responsive to the determination, the application selector component 118 can select the digital assistant application 142 accessible via the client device 132. The application selector component 118 can determine that there are multiple digital assistant applications 142 accessible via the one or more client devices 132. Responsive to the determination that there are multiple digital assistant applications 14, the application selector component 118 can select the one digital assistant application 142 accessible via the client device 132 whose functionality can support the action specified by the command. Conversely, the application selector component 118 can determine the functionality of the digital assistant application 142 hosted on the vehicle 144 but not that of the digital assistant application 142 accessible via the client device 132 can support the action specified by the command. Responsive to the determination, the application selector component 118 can select the digital assistant application 142 hosted on the vehicle 144.

When both functionalities of the digital assistant applications 142 accessible via the client device 132 and hosted on the vehicle 144 are determined support the action specified by the command, the digital assistant application 142 can select based on which digital assistant application 142 can more quickly carry out the action. The application selector component 118 can compare the version number of the digital assistant application 142 hosted on the vehicle 144 with the version number of the digital assistant application 142 accessible via the client device 132. The application selector component 118 can select the digital assistant application 142 with the higher version number, as the corresponding the digital assistant application 142 may be more up-to-date. The application selector component 118 can compare the computing resources consumption at the vehicle 144 with the computing resources consumption at the client device 132. The application selector component 118 can select the client device 132 or the vehicle 144 based on which has the lower computing resource consumption, as the action specified by the command is likely to be executed faster when computing resource consumption is lower.

The application selector component 118 can also select the digital assistant application 142 accessible via the client device 132 or the functionality of the digital assistant application 142 hosted on the vehicle 144 based on other factors. These other factors can override the selection based on the determination on which digital assistant application 142 can support the action specified by the command. The application selector component 118 can also select the digital assistant application 142 accessible via the client device 132 or the digital assistant application 142 hosted on the vehicle 144 based on an input via a vehicle input interface. The vehicle input interface may be one of the peripheral devices 138 connected to the vehicle 144, such as a button on a steering wheel or a touchscreen on a center stack in the vehicle 144. For example, the selection may be based on a length of a button press on the button on the steering wheel of the vehicle 144. The application selector component 118 can determine that the length of the button press is greater than or equal to a predetermined threshold (e.g., 5 seconds). In response to the determination, the application selector component 118 can select the digital assistant application 142 hosted on the vehicle 144. The application selector component 118 can determine that the length of the button press is shorter than the predetermined threshold. In response to this determination, the application selector component 118 can select the digital assistant application 142 accessible via the client device 132. A position of the interaction on the touchscreen may also be used to select the digital assistant application 142 accessible via the client device 132 or the digital assistant application 142 hosted on the vehicle 144.

The application selector component 118 can also select the digital assistant application 142 accessible via the client device 132 or the functionality of the digital assistant application 142 hosted on the vehicle 144 based on the trigger keyword recognized in the audio input signal. The application selector component 118 can compare the trigger keyword to a set of keywords associated with corresponding digital assistant applications 148. Based on the comparison of the trigger word detected from the audio input signal with the set of associated keywords, the application selector component 118 can select the corresponding digital assistant application 148. For example, there may be two client devices 132 in the vehicle 144 with respective digital assistant applications 148 associated with different trigger keywords. The trigger word "okay" may be associated with the digital assistant application 148 on a first client device 132 and the trigger word "hey" may be associated with the digital assistant application 148 on a second client device 132. Using the set of keywords, when the audio input signal including "hey" is received, the application selector component 118 can select the digital assistant application 148 on the second client device 132.

The application selector component 118 can also select the digital assistant application 142 accessible via the client device 132 or the functionality of the digital assistant application 142 hosted on the vehicle 144 based on whether the command is related to a vehicular function. As explained above, the NLP component 106 can determine whether the command is related to a vehicular or non-vehicular function using a semantic knowledge graph. Using the determination, the application selector component 118 can select the corresponding digital assistant application 142. The application selector component 118 can determine that the command is related to a vehicular function. In response to the determination, the application selector component 118 can select the digital assistant application 142 hosted on the vehicle 144. The application selector component 118 can determine that the command is determined to relate to a non-vehicular function. In response to the determination, the application selector component 118 can select the digital assistant application 142 accessible via the client device 132. The application selector component 118 can determine that there are multiple digital assistant applications 142 accessible via the one or more client devices 132. In response to the determination, the application selector component 118 can select the one digital assistant application 142 accessible via the client device 132 whose functionality can support the action specified by the command identified to be related to a non-vehicular function.

The application selector component 118 can determine that there are multiple digital assistant applications 142 accessible whose functionalities can support the action specified by the command. In response to the determination, the application selector component 118 can select one of the digital assistant applications 142 based on a quality score. These multiple digital assistant applications 142 can include the digital assistant applications 142 accessible via the one or more client devices 132 and the digital assistant application 142 hosted on the vehicle 144. The data processing system 102 can include, interface, or otherwise communicate with the performance evaluator component 120. The performance evaluator component 120 can determine the quality score for each digital assistant application 142 accessible via one or more client devices 132 based on any number of factors. The performance evaluator component 120 can determine the quality score based on a feedback indicator. The feedback indicator may be a numerical value representing a user's response to a prompt inquiring about quality of interaction with the digital assistant application 142. To obtain the feedback indicator, the digital assistant application 142 accessible via the client device 132 can display the prompt inquiring about quality of interaction on the client device 132 displaying the digital assistant application 142. The digital assistant application 142 hosted on the vehicle 144 or the performance evaluator component 120 can also display the prompt inquiring about quality of interaction on the vehicle 144 displaying the digital assistant application 142. The prompt may include one or more user interface elements (e.g., buttons, radio buttons, checkboxes, etc.), each indicating the quality of interaction. Once an interaction event is detected on one of the user interface elements on the prompt, the performance evaluator component 120 can identify the feedback indicator corresponding to the quality of interaction. The performance evaluator component 120 can determine the quality score using the feedback indicator.

The performance evaluator component 120 can also determine the quality score for each digital assistant application 142 based on a rating score from an application distribution platform. The application distribution platform can run on an external server accessible via the network 146. The external server can host applications, such as the digital assistant applications 142, for download by the client device 132 or the vehicle 144. The external server for the application distribution platform may store the rating scores for all the digital assistant applications 142. From the application distribution platform running on the external server, the performance evaluator component 120 can identify the rating score for each digital assistant application 142 identified as accessible via the client device 132 or hosted on the vehicle 144. The performance evaluator component 120 can send a request for the rating score to the external server, when there is connectivity with the network 146. Using the rating score for each digital assistant application 142, the performance evaluator component 120 can determine the quality score for the corresponding digital assistant application 142.

The performance evaluator component 120 can also run an automated test evaluation to determine the quality score for the corresponding digital assistant application 142. The automated test evaluation may be executed using an application or the performance evaluator component 120 interfacing with the digital assistant application 142. The automated test evaluation may include a set of audio input signal stimuli and a corresponding expected action data structure for the audio input signal stimuli. The automated test evaluation may be run simultaneous to the execution of the digital assistant application 142. While executing, the automated test evaluation can feed each audio input signal stimulus into the digital assistant application 142. The automated test evaluation can identify an action data structure generated by the digital assistant application 142. The automated test evaluation can compare the action data structure generated by the digital assistant application 142 with the expected action data structure. From the comparison, the automated test evaluation can identify a number of matches and a number of mismatches between the two action data structures. Based on the number of matches and the number of mismatches, the performance evaluator component 120 can determine the quality score for the digital assistant application 142.

Once the quality score for each digital assistant application 142 is determined, the application selector component 118 can select the digital assistant application 142 with the highest quality score having the functionality to support the action specified by the command. The quality score may be based on any combination of the feedback indicator, the rating score, and the automated test evaluation. The application selector component 118 can identify a subset of digital assistant applications 142 whose functionality can support the action specified by the command. From the subset of digital assistant applications 142, the application selector component 118 can identify the digital assistant application 142 with the highest quality score as determined by the performance evaluator component 120.

The application selector component 118 can invoke the digital assistant application 142 selected based on the determination that the functionality of the digital assistant application 142 can support the action specified by the command. To invoke the selected digital assistant application 142, the application selector component 118 can identify the action data structure corresponding to the command. The application selector component 118 can call the direct action API 112 of the selected digital assistant application 142 to execute and process the action data structure corresponding to the command in the audio input signal. The application selector component 118 can determine that the digital assistant application 142 selected is accessible via the client device 132. Responsive to the determination, the application selector component 118 can assign control of the input interfaces (e.g., the sensor 134, the interface 104, the transducer 140, and other peripheral devices 138) of the vehicle 144 to the client device 132. For example, the command may be to play an audio file on the client device 132, and the digital assistant application 142 selected is accessible via the client device 132. To carry out the command, the application selector component 118 can assign control of the speakers 136 from the vehicle 144 to the digital assistant application 142 accessible via the client device 132 (sometimes referred to in such instances as a "brought-in digital assistant application"), such that the audio is played from the speakers 136 of the vehicle 144.

In invoking the selected digital assistant application 142, the application selector component 118 can use application data from a non-selected digital assistant application 142. The application selector component 118 can access the data repository 122 of the non-selected digital assistant application 142 to retrieve the parameters 124, the policies 126, the response data 128, the templates 130, and other information (e.g., phone numbers, calendar events, etc.). For example, when the action specified by the command is to call a particular phone number, the application selector component 118 can retrieve the phone number from the non-selected digital assistant application 142 (or another application) running on a first client device 132. The application selector component 118 can store the retrieved application data in the local data repository 122. Prior to invocation, the application selector component 118 can modify the action data structure to include the application data retrieved from the non-selected digital assistant application 142. The application selector component 118 can then call the direct action API 112 of the selected digital assistant application 142 using the direct action structure modified by the application data retrieved from the non-selected digital assistant application 142. Continuing with the previous example, the application selector component 118 can call the selected digital assistant application 142 accessible via a second client device 132 to make the phone call using the phone number retrieved from the first client device 132.

Figure 2:
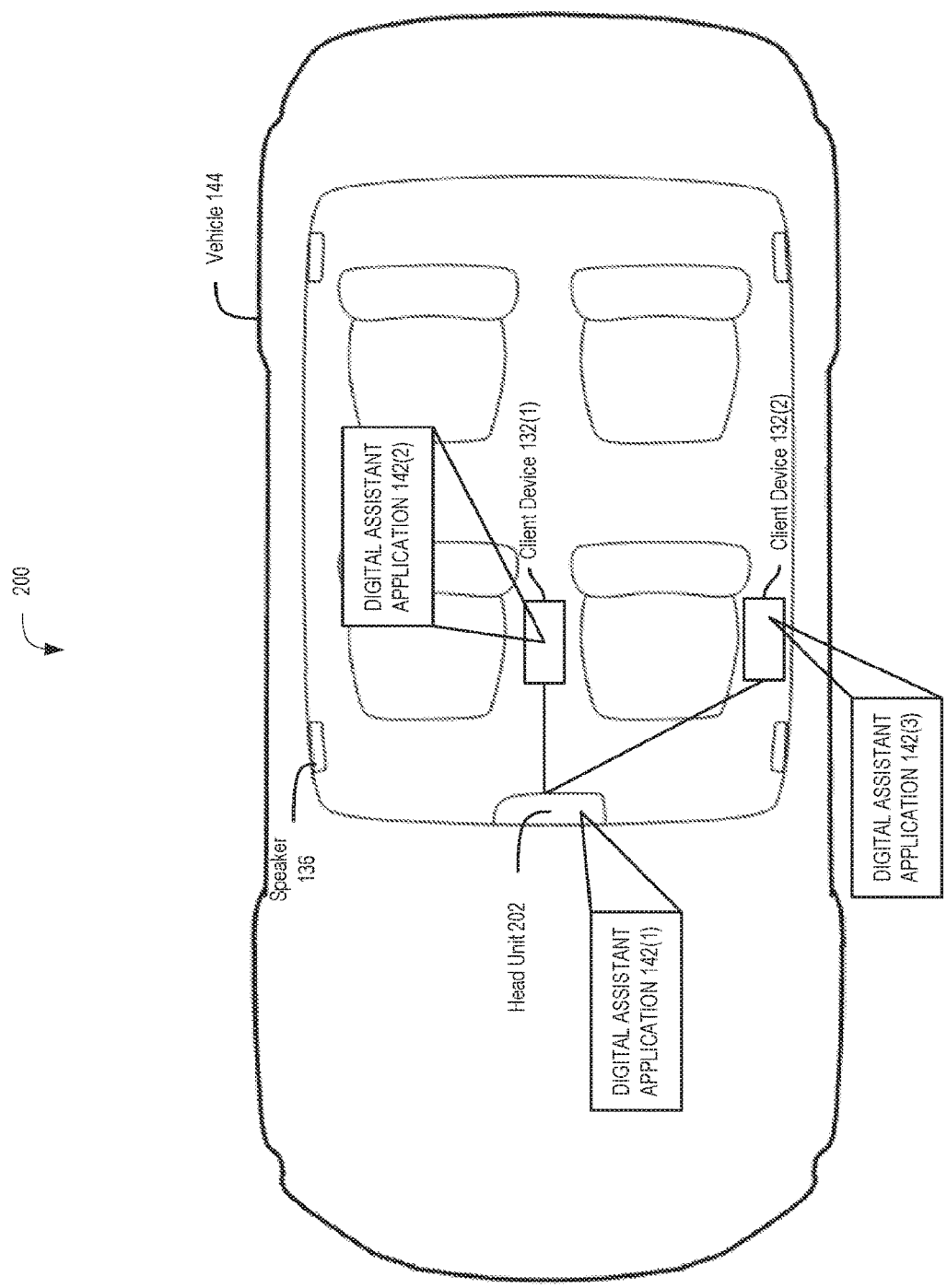
FIG. 2 illustrates a top view of the vehicle and illustrates the interior cabin of the vehicle illustrated in FIG. 1.

FIG. 2 illustrates a top view of the vehicle 144 and illustrates the interior cabin of the vehicle 144. In the vehicular environment 200, the interior cabin of the vehicle 144 can include four seats, a plurality of speakers 136, and two client devices 132(1) and 132(2). The two client devices 132(1) and 132(2) may have been carried in by one or more passengers of the vehicle 144. The vehicle 144 can also include a head unit 202. The head unit 202 can execute one or more of the components described in relation to the data processing system 102, such as a digital assistant application 142(1), the configuration tracker component 116, the application selector component 118, and the performance valuator component 120. The client device 132(1) can execute or make accessible one or more of the components described in relation to the data processing system 102, such a digital assistant application 142(2). The client device 132(2) also can execute or make accessible one or more of the components described in relation to the data processing system 102, such a digital assistant application 142(3). The client devices 132(1) and 132(2) may have established communication links (e.g., via pairing) with the head unit 202.

Referring to FIG. 1 among others, a transducer 140 within the vehicle 144 may detect an audio input signal uttered by a passenger within the vehicle 144. Upon detection of the audio input signal, the NLP component 106 operating from the head unit 202 of the vehicle 144 can parse the audio input signal to identify a command. Using the command parsed from the audio input signal, the direct action API 112 running in the head unit 202 of the vehicle 144 can generate an action data structure. The action data structure can include data or instructions for the execution of a specified action to satisfy the command.

The configuration tracker component 116 operating from the head unit 202 of the vehicle 144 can identify each digital assistant application 141(1)-(3) running on or in communication with the head unit 202. The digital assistant applications 141(1)-(3) may have differing functionalities. For example, the digital assistant application 141(1) running in the head unit 202 may support vehicle-related commands (e.g., "pop the trunk") while the digital assistant application 141(2) of the client device 132(1) and the digital assistant application 141(2) of the client device 132(2) may support non-vehicle related commands (e.g., "play a song"). The configuration tracker component 116 can identify one or more functionalities of each of the identified digital assistant applications 141(1)-(3), such as the application profile, version number, connectivity to the network 146 or the vehicle 144, peripheral devices 138, consumption of computing resources, and supported routines, among others.

Having identified the functionalities of the digital assistant applications 141(1)-(3), the application selector component 118 can determine which digital assistant applications 141(1)-(3) can support the action specified by the command. The application selector component 118 can select the digital assistant application 141(1)-(3) based on which can support the action specified by the command. When two or more of the digital assistant application 141(1)-(3) can support the action specified by the command, the application selector component 118 can select one of the digital assistant applications 141(1)-(3) using other factors, such as the version number and consumption of computing resources, among others. Once determined, the application selector component 118 can invoke the selected digital assistant application 141(1)-(3) by calling the respective direct action API 112 to execute in accordance with the generated action data structure. When application data from one digital assistant application 141(2) is to be used by the selected digital assistant application 141(3), the application data may be transferred from the selected digital assistant application 141(2) to the non-selected digital assistant application 141(3). The application selector component 118 can modify the data structure using the transferred data structure. The direct action API 112 may be called to carry out the action specified by the command.

Figure 3:
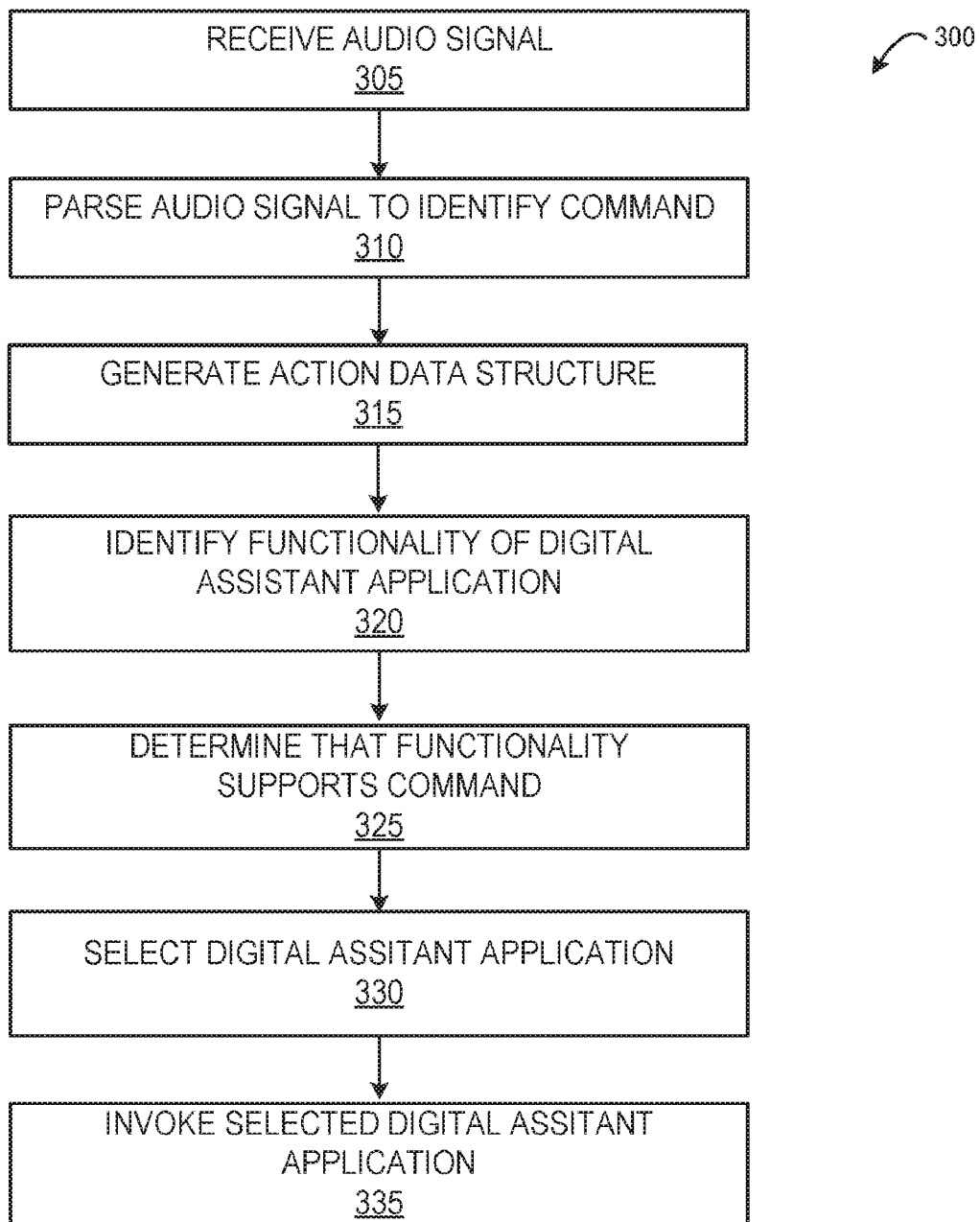
FIG. 3 illustrates a method to selectively invoke applications for execution using the example system illustrated in FIG. 1.

FIG. 3 illustrates an example method 300 to selectively invoke applications for execution. The method 300 may be implemented or executed by the system 100 described above in conjunction with FIGS. 1 and 2 or system 400 detailed below in conjunction with FIG. 4. The method 300 can include receiving an audio signal (BLOCK 305). The method 300 can include parsing the audio signal to identify a command (BLOCK 310). The method 300 can include generating an action data structure (BLOCK 315). The method 300 can include identifying a functionality of a digital assistant application (BLOCK 320). The method 300 can include determining that the functionality supports the command (BLOCK 325). The method 300 can include selecting the digital assistant application (BLOCK 330). The method 300 can include invoking the selected digital assistant application (BLOCK 335).

The method 300 can include receiving an audio signal (BLOCK 305). A data processing system can receive the input audio signal. For example, an NLP component, executed by the data processing system, can receive the input audio signal. The data processing system (and the NLP component) can be a component of or otherwise executed by a client device, a vehicle, or be a standalone device. The sensor, such as a microphone, at the client device or the vehicle can detect the input audio signal and then the respective client device or vehicle can transmit the input audio signal to the data processing system. For example, an application executed on the client device can detect a user speaking "Ok, open the sunroof." The detected utterance can be encoded into an input audio signal and transmitted to the NLP component of the data processing system or vehicle.

The method 300 can include parsing the audio signal to identify a command (BLOCK 310). The NLP component can parse the input audio signal to identify a request in the input audio signal. The NLP component can identify a vehicle associated with the request. The NLP component can identify a fulfillment interface associated with the request and the vehicle. The fulfillment interface can be the interface of one of the client device or the vehicle that will execute the action data structure to fulfill the request of the input audio signal.

In the above example, the request can be to open the sunroof. In this example, the fulfillment interface can be the interface of the vehicle that includes the sunroof. In some implementations, the vehicle can be explicitly stated in the input audio signal. For example, a user may assign nicknames to his vehicle (e.g., the user may name his red Toyota Camry the "red car"). When explicitly stated, the input audio signal could be "OK, open the sunroof of my red car." In some implementations, the data processing system can determine which vehicles associated with the user's account can fulfill the action. For example, the user's red car may include a sun roof and the user's blue car may not. After receiving the input audio signal "Ok, open the sunroof." The data processing system may automatically select the user's red car. In some implementations, the data processing system may ask the user for confirmation of the vehicle.

The method 300 can include generating an action data structure (BLOCK 315). The direct action API can generate the data structure that can be transmitted and processed by the client device or the vehicle to fulfil the request of the input audio signal. For example, continuing the above example, the direct action API can generate a first action data structure for opening the sunroof of the user's car. The direction action API can generate the action data structure using a template retrieved from the data processing system's data repository. The action data structure can include fields used to fulfill the request. For example, for the request to open the sunroof, the action data structure can include a field (or attribute) for the vehicle ID to which the action data structure should be transmitted when the action data structure is approved.

The method 300 can include identifying a functionality of a digital assistant application (BLOCK 320). For example, a configuration tracker component can identify each digital assistant application in the vehicle. The digital assistant applications can be hosted on the vehicle itself or may be accessible via the client device. All of the digital assistant applications in the vehicle may be communicatively linked via short-range communications. For each digital assistant application identified, the configuration tracker component can identify the functionality of the digital assistant application, such as the application profile, version number, connectivity to the network 146 or the vehicle 144, peripheral devices 138, consumption of computing resources, and supported routines, among others.

The method 300 can include determining that the functionality supports the command (BLOCK 325). For instance, an application selector component can determine whether the functionality identified for the corresponding digital assistant application supports the action specified by the command. Some commands may be related to a vehicle function (e.g., "open the sunroof"), while other commands may be related to a non-vehicle function (e.g., "call John"). The determination whether the command relates to a vehicle function or a non-vehicle function may be performed by the NLP component. The application selector component can compare the functionality of each digital assistant application with the action specified by the command.

The method 300 can include selecting the digital assistant application (BLOCK 330). For example, the application selector component can select the digital assistant application determined to be able to support the action specified by the command. When the functionality of the digital assistant application hosted on the vehicle can support the action specified by the command, the application selector component can select the digital assistant application hosted on the vehicle, in lieu of the application accessible via the client device. When the functionality of the digital assistant application accessible via the client device can support the action specified by the command, the application selector component can select the digital assistant application hosted on the vehicle, in lieu of the application hosted on the vehicle. When both digital assistant applications can support the action specified by the command, the application selector component can use other factors (e.g., latency or computing resources consumed) to select one of the multiple digital assistant applications.

The method 300 can include invoking the selected digital assistant application (BLOCK 335). For instance, the application selector component can invoke the digital assistant application selected based on the determination that the application can support the action supported by the command. The application selector component can call the direct action API of the selected digital assistant application using the action data structure for the command. The action data structure may be modified by the application selector component using application data from the non-selected digital assistant application.

Figure 4:
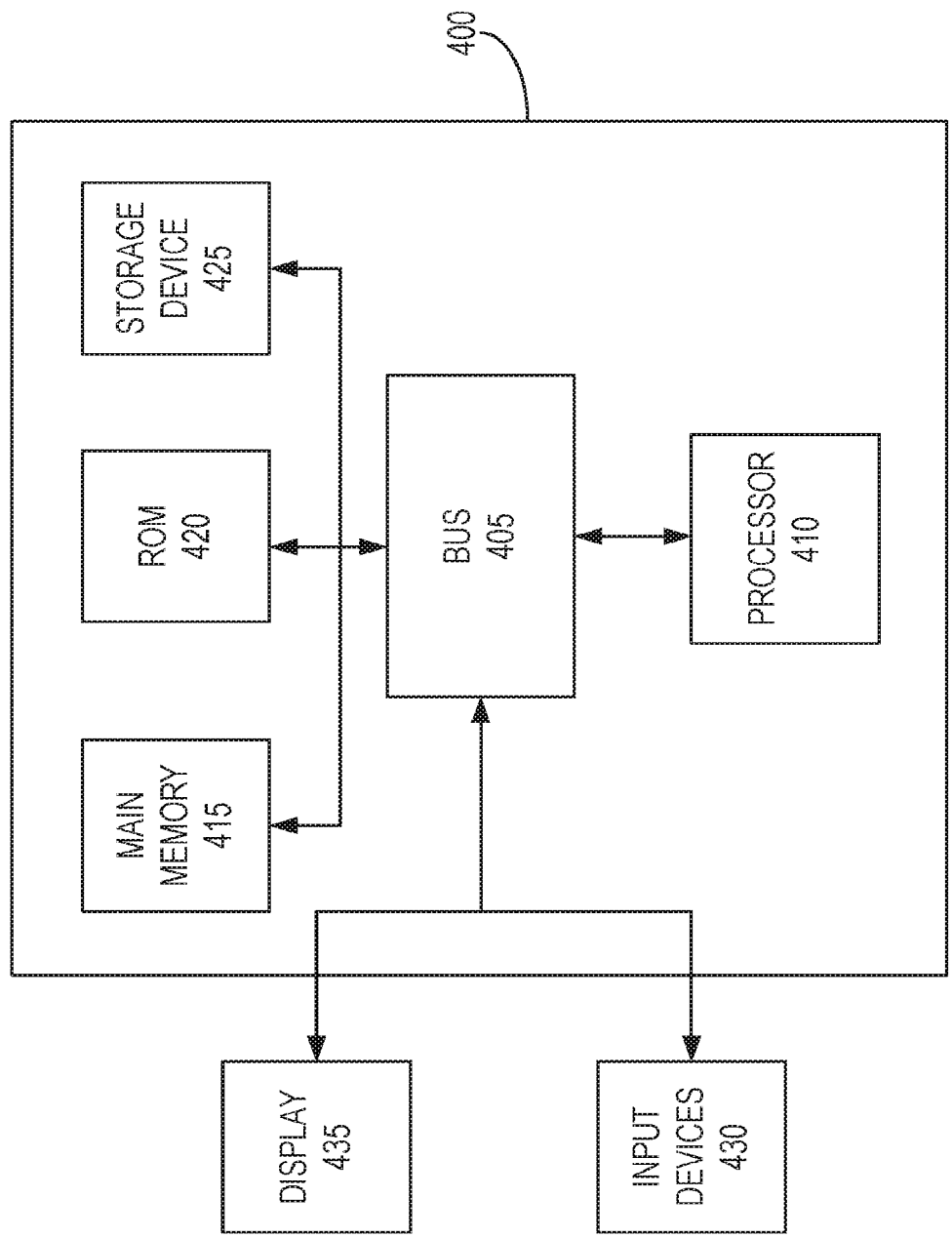
FIG. 4 is a block diagram of an example computer system.

FIG. 4 is a block diagram of an example computer system 400. The computer system or computing device 400 can include or be used to implement the system 100 or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information and instructions to be executed by the processor 410. The main memory 415 can be or include the data repository 122. The main memory 415 can also be used for storing position information, temporary variables, or other intermediate information during execution of instructions by the processor 410. The computing system 400 may further include a read-only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 122.

The computing system 400 may be coupled via the bus 405 to a display 435, such as a liquid crystal display or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing devices 132, or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including, by way of example, a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 146). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client devices 132 or the vehicle 144).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 106 and the direct action API 112 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A method implemented by one or more processors of a vehicle computing device of a vehicle, the method comprising:
   receiving, via one or more microphones of the vehicle computing device, an input audio signal that includes:
   (i) a first portion capturing a given trigger word or phrase, and (ii) a second portion capturing a request;
   determining, based on processing the first portion of the input audio signal that includes the given trigger word or phrase, a given digital assistant application, from among a plurality of digital assistant applications that are accessible by the vehicle computing device, that is associated with the given trigger word or phrase,
      wherein each of the plurality of digital assistant applications that are accessible by the vehicle computing device correspond to different scripts or programs that executable by a data processing system of vehicle computing device,
      wherein the plurality of digital assistant applications that are accessible by the vehicle computing device include at least a first digital assistant application and a second digital assistant application,
      wherein the first digital assistant application is associated with a set of vehicular functionalities, and
      wherein the second digital assistant application is associated with a set of non-vehicular functionalities;
   determining, based on processing the second portion of the input audio signal that includes the request, an action to be performed responsive to the request;
   in response to determining that the given trigger word or phrase is a first trigger word or phrase that is associated with the first digital assistant application:
      causing the first digital assistant application to perform the action to satisfy the request; and
   in response to determining that the given trigger word or phrase is a second trigger word or phrase that is associated with the second digital assistant application:
      causing the second digital assistant application to perform the action to satisfy the request.

2. The method of claim 1, wherein the plurality of digital assistant applications that are accessible by the vehicle computing device further include a third digital assistant application.

3. The method of claim 2, further comprising:
   in response to determining that the given trigger word or phrase is a third trigger word or phrase that is associated with the third digital assistant application:
      causing the third digital assistant application to perform the action to satisfy the request.

4. The method of claim 1, wherein an indication of the given digital assistant application is stored in association with the given trigger word or phrase in one or more databases that are accessible to the vehicle computing device.

5. The method of claim 4, wherein a corresponding indication of each of the plurality of digital assistant applications is stored in association with a corresponding trigger word or phrase in the one or more databases that are accessible to the vehicle computing device.

6. The method of claim 1, wherein determining the given digital assistant application that is associated with the given trigger word or phrase and based on processing the first portion of the input audio signal that includes the given trigger word or phrase comprises:

parsing, using a natural language processor component of the vehicle computing device, the first portion of the input audio signal to identify the given trigger word or phrase; and determining, based on parsing the input audio signal to identify the given trigger word or phrase, that the given trigger word or phrase is associated with the given digital assistant application.

7. The method of claim 6, wherein determining the action to be performed responsive to the request and based on processing second portion of the input audio signal that includes the request comprises:

parsing, using the natural language processor component of the vehicle computing device, the second portion of the input audio signal to identify the request; and determining, based on parsing the input audio signal to identify the request, the action to be performed responsive to the request.

8. The method of claim 1, wherein the action to be performed responsive to the request includes one or more of: changing temperature controls of the vehicle, actuating one or more locks or windows of the vehicle, turning on or off a device of the vehicle, or controlling playback of media via one or more speakers of the vehicle computing device.

9. A vehicle computing device of a vehicle, the vehicle computing device comprising:

one or more hardware processors; and memory storing instructions that, when executed by the one or more hardware processors, cause the one or more hardware processors to:

receive, via one or more microphones of the vehicle computing device, an input audio signal that includes: (i) a first portion capturing a given trigger word or phrase, and (ii) a second portion capturing a request;

determine, based on processing the first portion of the input audio signal that includes the given trigger word or phrase, a given digital assistant application, from among a plurality of digital assistant applications that are accessible by the vehicle computing device, that is associated with the given trigger word or phrase, wherein each of the plurality of digital assistant applications that are accessible by the vehicle computing device correspond to different scripts or programs that executable by a data processing system of vehicle computing device, wherein the plurality of digital assistant applications that are accessible by the vehicle computing device include at least a first digital assistant application and a second digital assistant application, wherein the first digital assistant application is associated with a set of vehicular functionalities, and wherein the second digital assistant application is associated with a set of non-vehicular functionalities;

determine, based on processing the second portion of the input audio signal that includes the request, an action to be performed responsive to the request;

in response to determining that the given trigger word or phrase is a first trigger word or phrase that is associated with the first digital assistant application:

cause the first digital assistant application to perform the action to satisfy the request; and in response to determining that the given trigger word or phrase is a second trigger word or phrase that is associated with the second digital assistant application:

cause the second digital assistant application to perform the action to satisfy the request.

10. The vehicle computing device of claim 9, wherein the plurality of digital assistant applications that are accessible by the vehicle computing device further include a third digital assistant application.

11. The vehicle computing device of claim 10, wherein the instructions further cause the one or more hardware processors to:

in response to determining that the given trigger word or phrase is a third trigger word or phrase that is associated with the third digital assistant application:

cause the third digital assistant application to perform the action to satisfy the request.

12. The vehicle computing device of claim 9, wherein an indication of the given digital assistant application is stored in association with the given trigger word or phrase in one or more databases that are accessible to the vehicle computing device.

13. The vehicle computing device of claim 4, wherein a corresponding indication of each of the plurality of digital assistant applications is stored in association with a corresponding trigger word or phrase in the one or more databases that are accessible to the vehicle computing device.

14. The vehicle computing device of claim 9, wherein the instructions to determine the given digital assistant application that is associated with the given trigger word or phrase and based on processing the first portion of the input audio signal that includes the given trigger word or phrase comprise instructions to:

parse, using a natural language processor component of the vehicle computing device, the first portion of the input audio signal to identify the given trigger word or phrase; and determine, based on parsing the input audio signal to identify the given trigger word or phrase, that the given trigger word or phrase is associated with the given digital assistant application.

15. The vehicle computing device of claim 14, wherein the instructions to determine the action to be performed responsive to the request and based on processing the second portion of the input audio signal that includes the request comprise instructions to:

parse, using the natural language processor component of the vehicle computing device, the second portion of the input audio signal to identify the request; and determine, based on parsing the input audio signal to identify the request, the action to be performed responsive to the request.

16. A non-transitory computer-readable storage medium storing instructions that, when executed, cause one or more hardware processors of a vehicle computing device of a vehicle to perform operations, the operations comprising:

receiving, via one or more microphones of the vehicle computing device, an input audio signal that includes: (i) a first portion capturing a given trigger word or phrase, and (ii) a second portion capturing a request;

determining, based on processing the first portion of the input audio signal that includes the given trigger word or phrase, a given digital assistant application, from among a plurality of digital assistant applications that are accessible by the vehicle computing device, that is associated with the given trigger word or phrase,
   wherein each of the plurality of digital assistant applications that are accessible by the vehicle computing device correspond to different scripts or programs that executable by a data processing system of vehicle computing device,
   wherein the plurality of digital assistant applications that are accessible by the vehicle computing device include at least a first digital assistant application and a second digital assistant application,
   wherein the first digital assistant application is associated with a set of vehicular functionalities, and
   wherein the second digital assistant application is associated with a set of non-vehicular functionalities;
determining, based on processing the second portion of the input audio signal that includes the request, an action to be performed responsive to the request;
in response to determining that the given trigger word or phrase is a first trigger word or phrase that is associated with the first digital assistant application:
   causing the first digital assistant application to perform the action to satisfy the request; and
in response to determining that the given trigger word or phrase is a second trigger word or phrase that is associated with the second digital assistant application:
   causing the second digital assistant application to perform the action to satisfy the request.

* * * * *